US008825572B2

(12) United States Patent
Nori et al.

(10) Patent No.: US 8,825,572 B2
(45) Date of Patent: Sep. 2, 2014

(54) PROGRAM SYNTHESIS WITH EXISTENTIALLY AND UNIVERSALLY QUANTIFIED BELIEF PROPAGATION USING PROBABILISTIC INFERENCE

(75) Inventors: Aditya Nori, Bangalore (IN); Sriram Rajamani, Bangalore (IN); Rahul Srinivasan, Bombay (IN); Sumit Gulwani, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 678 days.

(21) Appl. No.: 13/018,643

(22) Filed: Feb. 1, 2011

(65) Prior Publication Data
US 2012/0197829 A1    Aug. 2, 2012

(51) Int. Cl.
*G06F 19/28* (2011.01)
*G06N 7/00* (2006.01)

(52) U.S. Cl.
CPC ............................. *G06N 7/005* (2013.01)
USPC ............... 706/13; 706/19; 706/56; 717/106; 717/111

(58) Field of Classification Search
CPC ............ G06F 8/313; G06F 8/30; G06F 8/20; G06F 8/36; G06F 8/34; G06F 8/10; G06F 8/33
USPC ........................................................... 706/13
See application file for complete search history.

(56) References Cited

U.S. PATENT DOCUMENTS

| 7,249,333 | B2 | 7/2007 | Yu |
| 7,380,224 | B2 | 5/2008 | Franco |
| 2007/0179920 | A1 | 8/2007 | Zhang |
| 2008/0172650 | A1 | 7/2008 | Gulwani |

OTHER PUBLICATIONS

Solar-Lezama et al., "Combinatorial Sketching for Finite Programs", 2006.*
Chechetka et al.; Focused Belief Propagation for Query-Specific Inference; Published Date: 2010; International Conference on Artificial Intelligence and Statistics (AISTATS), May 2010.
Egly et al.; Computing Stable Models with Quantified Boolean Formulas: Some Experimental Results; Published Date: 2001.
Solar-Lezama et al.; Combinatorial Sketching for Finite Programs; Published Date: 2006; Newsletter ACM SIGARCH Computer Architecture News—Proceedings of the 2006 ASPLOS Conference; vol. 34 Issue 5, Dec. 2006.
Gogate et al.; Formula-Based Probabilistic Inference; Retrieved Date: Sep. 3, 2010.
Nim; http://en.wikipedia.org/wiki/Nim.

(Continued)

Primary Examiner — Alan Chen
Assistant Examiner — Nathan Brown, Jr.
(74) Attorney, Agent, or Firm — Steve Wight; Carole Boelitz; Micky Minhas

(57) ABSTRACT

A quantified belief propagation (QBP) algorithm receives as input an existentially quantified boolean formula (QBF) of existentially quantified boolean variables, universally quantified variables, and boolean operators. A tripartite graph is constructed, and includes (i) there-exists nodes that correspond to and represent the existentially quantified variables, (ii) for-all nodes that correspond to and represent the universally quantified variables, and (iii) sub-formula nodes that correspond to and represent sub-formulas of the QBF. A set of boolean values of the existentially quantified variables is found by (i) passing a first message from an arbitrary sub-formula node to an arbitrary for-all node, and (ii) in response, passing a second message from the arbitrary for-all node to the arbitrary sub-formula node.

20 Claims, 12 Drawing Sheets

(56) References Cited

OTHER PUBLICATIONS

SMTLIB: Satisfiability Modulo Theories Library; http://smtlib.org.
The Quantified Boolean Formulas Satisfiability Library; http://qbflib.org.
Braunstein et al.; Survey propagation: An algorithm for satisfiability. Random Structures and Algorithms; pp. 201-226, 2005.
Moura et al.; Z3: An efficient SMT solver; In Tools and Algorithms for the Construction and Analysis of Systems (TACAS); pp. 337-340, 2008.
Giunchiglia et al.; Quantifier structure in search-based procedures for qbfs; IEEE Trans. on CAD of Integrated Circuits and Systems, pp. 497-507, 2007.
Gold; Language identification in the limit; Information and Control, pp. 447-474, 1967.
Gulwani; Dimensions in program synthesis; In Principles and Practice of Declarative Programming (PPDP), 2010; http://research.microsoft.com/~sumitg/pubs/ppdp10-synthesis.pdf.
Gulwani et al.; Component based synthesis applied to bitvector circuits; Technical Report MSR-TR-2010-12, Microsoft Research, 2010.
Buning et al.; Resolution for quantified boolean formulas; Information and Computation, pp. 12-18, 1995.
Gulwani et al.; Program verification as probabilistic inference; In Principles of Programming Languages (POPL), pp. 277-289, 2007.
Itzhaky et al.; A simple inductive synthesis methodology and its applications; In Object-Oriented Programming, Systems, Languages and Applications (OOPSLA) 2010.
Jha et al.; Oracle-guided component-based program synthesis; In International Conference Software Engineering (ICSE), pp. 215-224, 2010.
Kroc et al. Survey propagation revisited; In Uncertainty in Artificial Intelligence (UAI), pp. 217-226, 2007.
Kschischang et al.; Factor graphs and the sum-product algorithm; IEEE Transactions on Information Theory, pp. 498-519, 2001.
Kuncak et al.; Complete functional synthesis; In Programming Languages Design and Implementation (PLDI), pp. 316-329, 2010.
Lau et al.; Version space algebras and its application to programming by demonstration; In International Conference on Machine Learning (ICML), pp. 527-534, 2000.
Liang et al.; Learning programs: A hierarchical Bayesian approach; In International Conference on Machine Learning (ICML), 2010.
Livshits et al.; Specification inference for explicit information flow problems; In PLDI '09: Programming Language Design and Implementation, pp. 75-86, 2009.
Mandelin et al.; Jungloid mining: Helping to navigate the API jungle; In Programming Languages Design and Implementation (PLDI), pp. 48-61, 2005.
Maneva et al.; A new look at survey propagation and its generalizations; Journal of the ACM, p. 17; 2007.
Mayer; Complete Program Synthesis for Linear Arithmetics; PhD thesis, EPFL, 2010.
Roth; On the hardness of approximate reasoning Artificial Intelligence; pp. 273-302, 1996.
Solar-Lezama; Program Synthesis by Sketching; PhD thesis University of California, Berkeley, 2008.
Solar-Lezama et al.; Programming by sketching for bit-streaming programs; In Programming Languages Design and Implementation (PLDI), pp. 281-294, 2005.
Solar-Lezama et al.; Combinatorial sketching for finite programs; In Architectural Support for Programming Languages and Operating Systems, pp. 404-415, 2006.
Srivastava et al.; From program verification to program synthesis; In Principles of Programming Languages (POPL) pp. 313-326, 2010.
Jojic et al.; Probabilistic inference of programs from input/output examples; Technical Report MSR-TR-2006-103, Microsoft Research, 2006.
Zhang et al; Conflict driven learning in a quantified boolean satisfiability solver; In International Conference on Computer Aided Design (ICCAD), pp. 442-449, 2002.
Minka et al; Infer.NET 2.2, 2009 Microsoft Research Cambridge; http://research.microsoft.com/infernet.

* cited by examiner

100

Decimate($\varphi$: Formula)
Returns: A satisfying assignment for $\varphi$, or FAIL
 1: $X := \{x_1, \ldots, x_n\}$
 2: while $Q \neq \emptyset$ do
 3:   $(x, v) := \text{BP}(F_\varphi(X))$
 4:   $\sigma(x) := v$
 5:   $\varphi := \varphi \mid_{x=v}$
 6:   $X := X \setminus \{x\}$
 7: end while
 8: if $F_\varphi(\sigma(x_1), \ldots, \sigma(x_n)) = 1$ then
 9:   return $\sigma$
10: else
11:   return FAIL
12: end if

FIG. 1

$$\varphi(x_1, x_2, x_3) = \underbrace{(x_1 \vee x_2)}_{\varphi_1} \wedge \underbrace{(\neg x_1 \vee x_3)}_{\varphi_2}$$

140

BP($G$: FactorGraph)
Returns: Highest marginal pair $(x, v)$
1: let $G = (V, E)$
2: for each $(x, f) \in E$ do
3:     $\mu_{x \to f}(x) = \mathcal{B}(\frac{1}{2})$
4: end for
5: $converged := 0$
6: while $converged = 0$ do
7:     for each factor to variable node edge $(f, x) \in E$ do
8:         $\mu_{f \to x}(x) = \alpha_{f,x} \sum_{\sim \{x\}} \left( f(X_f) \prod_{y \in \mathcal{N}(f) \setminus \{x\}} \mu_{y \to f}(y) \right)$
9:     end for
10:    if for each $(f, x), (x, f) \in E$, $\mu_{f \to x}, \mu_{x \to f}$ have converged then
11:        $converged := 1$
12:    end if
13:    for each variable to factor edge $(x, f) \in E$ do
14:        $\mu_{x \to f}(x) = \alpha_{x,f} \prod_{h \in \mathcal{N}(x) \setminus \{f\}} \mu_{h \to x}(x)$
15:    end for
16: end while
17: for each variable $x_i \in V$ do
18:    $p_i(x_i) := \alpha_{x_i} \prod_{f \in \mathcal{N}(x_i)} \mu_{f \to x_i}(x_i)$
19: end for
20: return $\arg\max_{x_i, v} p_i(x_i = v)$

QOOL!($\varphi$: $\exists^*\forall^*$-Formula)
Returns: A satisfying assignment for $\varphi$, or FAIL
1:   $\phi$ := Skolemize($\varphi$)
2:   $E$ := $\{e_1, \ldots, e_m\}$
3:   $U$ := $\{u_1, \ldots, u_n\}$
4:   $X$ := $E \cup U$
5:   while $E \neq \emptyset$ do
6:     $(e, v)$ := QBP($F_\phi(X)$)
7:     $\sigma(e)$ := $v$
8:     $\phi$ := $\phi\,|_{e=v}$
9:     $E$ := $E \setminus \{e\}$
10:    $X$ := $X \setminus \{e\}$
11: end while
12: if $\forall u_1 \cdots u_n.F_\phi(\sigma(e_1), \ldots, \sigma(e_m), u_1, \ldots, u_n) = 1$ then
13:    return $\sigma$
14: else
15:    return FAIL
16: end if

QBP($G$: QFG)
Returns: Highest marginal pair $(e, v)$
1:  let $G = (V \cup U, E)$
2:  for each $(x, f) \in V \cup U$ do
3:      $\mu_{x \to f}(x) = B(\frac{1}{2})$
4:  end for
5:  $converged := 0$
6:  while $converged = 0$ do
7:      for each factor to variable node edge $(f, x) \in E$ s.t. $x \in V \cup U$ do
8:          $\mu_{f \to x}(x) = \alpha_{f,x} \sum_{\sim \{x\}} \left( f(X_f) \prod_{y \in \mathcal{N}(f) \setminus \{x\}} \mu_{y \to f}(y) \right)$
9:      end for
10:     for each existential variable to factor edge $(x, f) \in E$ s.t. $x \in V$ do
11:         $\mu_{x \to f}(x) = \alpha_{x,f} \prod_{h \in \mathcal{N}(x) \setminus \{f\}} \mu_{h \to x}(x)$
12:     end for
13:     for each universal variable to factor edge $(x, f) \in E$ s.t. $x \in U$ do
14:         $\mu_{x \to f}(x) = \neg \mu_{f \to x}(x)$
15:     end for
16:     if for each $(f, x), (x, f) \in E$, $\mu_{f \to x}, \mu_{x \to f}$ have converged then
17:         $converged := 1$
18:     end if
19: end while
20: for each variable $x_i \in V$ do
21:     $p_i(x_i) := \alpha_{x_i} \prod_{f \in \mathcal{N}(x_i)} \mu_{f \to x_i}(x_i)$
22: end for
23: return $\arg\max_{x_i, v} p_i(x_i = v)$

| Benchmark | Specification |
|---|---|
| I1 | Decrement $x$ by 2: $x - 2$ |
| I2 | Split *number* into *tens* and *units*: $number = 10 * tens + unit$ |
| I3 | Find the time left to transfer a file of total size $K$, given that the rate of transfer is *rate* and size $p$ has already been transferred: $p + t * rate = K$ |

```
I1:                          I2:
Input: x                     Input: x
Output: o2                   Output: tens, units
1: o1 = x-1                  1: tens = x/10
2: o2 = o1-1                 2: units = x%2

I3:
Input: K, rate, p
Output: t
1: t = (K-p)/rate
```

FIG. 8

```
B1:
Input: x
Output: o2
1: o1 = bvsub(x,1)
2: o2 = bvand(x,o1)

B3:
Input: x
Output: o3
1: o1 = bvnot(x)
2: o2 = bvadd(x,1)
3: o3 = bvand(o1,o2)

B5:
Input: x
Output: o7
1: o1 = bvshr(x,1)
2: o2 = bvxor(x,o1)
3: o3 = bvshr(o2,2)
4: o4 = bvxor(o2,o3)
5: o5 = bvadd(o4,0x11111111)
6: o6 = bvmul(o5,0x11111111)
7: o7 = bvshr(o6,28)

B6:
Input: x
Output: o12
1:  o1 = bvsub(x,1)
2:  o2 = bvshr(o1,1)
3:  o3 = bvor(o1,o2)
4:  o4 = bvshr(o3,2)
5:  o5 = bvor(o3,o4)
6:  o6 = bvshr(o5,4)
7:  o7 = bvor(o5,o6)
8:  o8 = bvshr(o7,8)
9:  o9 = bvor(o7,o8)
10: o10 = bvshr(o9,16)
11: o11 = bvor(o9,o10)
12: o12 = bvadd(o10,1)
```

```
B2:
Input: x
Output: o2
1: o1 = bvadd(x,1)
2: o2 = bvor(x,o1)

B4:
Input: x
Output: o4
1: o1 = bvsub(x,1)
2: o2 = bvor(x,o1)
3: o3 = badd(o2,1)
4: o4 = band(o3,x)
```

280

```
Nim:
Input: A, B
Output: o3
1: o1 = max(A,B)
2: o2 = min(A,B)
3: o3 = o1-o2
```

| Benchmark | QOOL! seconds | BP (seconds) seconds |
|---|---|---|
| Q1 | 1.9 | 2.3 |
| Q2 | 3.0 | 5.2 |
| I1 | 2.8 | 3.6 |
| I2 | 2.9 | 21.7 |
| I3 | 10.8 | 328.6 |
| B1 | 2.4 | 2.9 |
| B2 | 2.4 | 3.6 |
| B3 | 5.7 | 15.1 |
| B4 | 7.6 | 164 |
| B5 | 785.4 | timeout |
| B6 | 690.8 | timeout |
| Nim | 31 | timeout |

PROGRAM SYNTHESIS WITH EXISTENTIALLY AND UNIVERSALLY QUANTIFIED BELIEF PROPAGATION USING PROBABILISTIC INFERENCE

BACKGROUND

Quantified belief propagation has many applications, such as in the field of program synthesis, which involves discovering programs that realize specified user intent. Program synthesis can be useful in scenarios such as: enabling people with no programming background to develop utility programs, helping regular programmers automatically discover tricky or mundane details, program understanding, discovery of new algorithms, and even teaching. The program synthesis problem can be thought of as a search for a desired program over a given search space, starting from some given specification of user intent.

In several of the program synthesis examples listed above, the problem reduces to the problem of solving a QBF (Quantified Boolean Formulas) formula of the form $\exists \bar{x} \cdot \forall \bar{y} \cdot \phi(\bar{x}, \bar{y})$, where $\bar{x}$ and $\bar{y}$ are vectors of variables, and all the existential quantifiers in the formula occur before all the universal quantifiers. This naturally happens when the search space is that of straight-line programs, or the user specification is in the form of input-output examples. Recently, it was shown that even synthesis of loopy programs can be reduced to solving QBF formulas after some reduction involving the use of templates.

The class of straight-line programs, or more generally, loop-free programs, parameterized by the set of operators or components used, can often express a wide range of useful programs. Even though these types of programs may not involve loops, they can be challenging to synthesize. Moreover, the space of loop-free programs is vast and the number of possible programs is exponential in the number of components in the program. Brute-force search methods do not scale well for these problems.

There are two drawbacks in the current development approaches to solving program synthesis problems. First, most of the abovementioned program synthesis problems have necessitated development of new problem-specific algorithms. These algorithms are based on a variety of approaches ranging from exhaustive search, version space algebras, genetic programming, and SAT/SMT (Satisfaction/Satisfiability Modula Theories) solving. The second drawback is that these specialized algorithms do not scale well.

Described below are techniques to solve $\exists^* \forall^*$QBF formulas (existentially and universally quantified QBF) using probabilistic inference techniques. While the techniques are useful for program synthesis, they have application beyond the program synthesis problem.

SUMMARY

The following summary is included only to introduce some concepts discussed in the Detailed Description below. This summary is not comprehensive and is not intended to delineate the scope of the claimed subject matter, which is set forth by the claims presented at the end.

A quantified belief propagation (QBP) algorithm receives as input an existentially quantified boolean formula (QBF) of existentially quantified boolean variables, universally quantified variables, and boolean operators. A tripartite graph is constructed, and includes (i) there-exists nodes that correspond to and represent the existentially quantified variables, (ii) for-all nodes that correspond to and represent the universally quantified variables, and (iii) sub-formula nodes that correspond to and represent sub-formulas of the QBF. A set of boolean values of the existentially quantified variables is found by (i) passing a first message from an arbitrary sub-formula node to an arbitrary for-all node, and (ii) in response, passing a second message from the arbitrary for-all node to the arbitrary sub-formula node.

Many of the attendant features will be explained below with reference to the following detailed description considered in connection with the accompanying drawings.

BRIEF DESCRIPTION OF THE DRAWINGS

The present description will be better understood from the following detailed description read in light of the accompanying drawings, wherein like reference numerals are used to designate like parts in the accompanying description.

FIG. 1 shows a Decimate procedure.
FIG. 3 shows a belief propagation algorithm.
FIG. 5 shows an algorithm for solving QBFs.
FIG. 6 shows a quantified belief propagation (QBP) algorithm.
FIG. 7 shows a benchmark table.
FIG. 8 shows programs synthesized by the algorithm in FIG. 5.
FIG. 10 shows programs synthesized for the specifications in FIG. 9.
FIG. 11 shows comparative results.

DETAILED DESCRIPTION

1. Introduction

Figure 2:
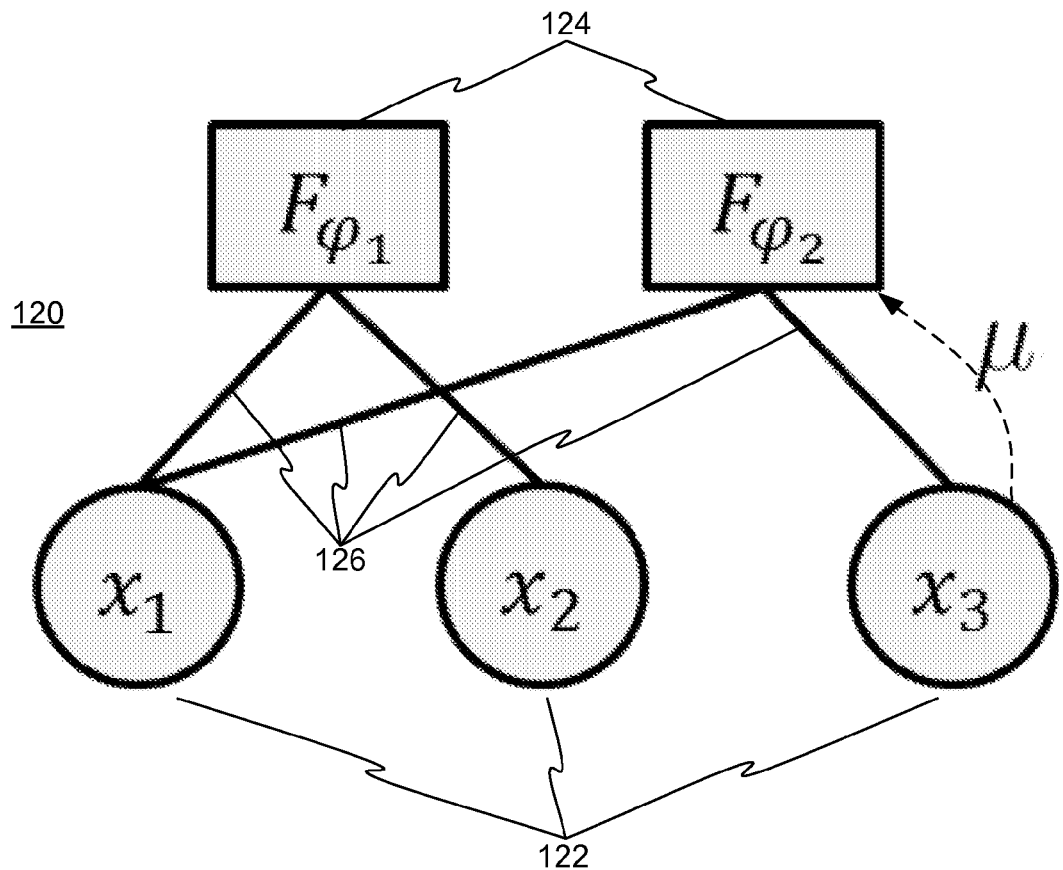
FIG. 2 shows a factor graph for an example $F_\phi$.

To aid understanding, a review will be provided regarding how probabilistic inference, and more specifically belief propagation, is used to solve SAT formulas. An SAT formula $\exists \bar{x} \cdot \phi(\bar{x})$, where $\phi(\bar{x})$ is a conjunction of formulae $\phi_1(\bar{x})$, $\phi_2(\bar{x})$, $\phi_3(\bar{x})$, ..., $\phi_m(\bar{x})$, is represented as a factor graph, which is a bipartite graph (for an example, see FIG. 2) with one part in the partition consisting of nodes (called variable nodes) to represent each of the variables in $\bar{x}$, and another part in the partition consisting of nodes (called factor nodes) to represent each component of the conjunction $\phi_1(\bar{x})$, $\phi_2(\bar{x})$, $\phi_3(\bar{x})$, ..., $\phi_m(\bar{x})$. An edge is drawn from a factor node $\phi_i$ to a variable node $x_j$ if the function $\phi_i$ depends on variable $x_j$.

Belief propagation is performed by iteratively sending messages across each edge in the factor graph. A variable node sends a message $x_j$ to a factor node $\phi_i$, indicating the probability with which $x_j$ is true, and a factor node $\phi_i$ sends a message $x_j$ indicating the requirement $\phi_i$ has on the probability distribution of $x_j$ for $\phi_i$ to be satisfied (for a formal presentation of this algorithm, see Section 2, FIG. 3). The messages are repeated in rounds until convergence is reached (that is, the messages sent on every edge in successive rounds is the same). Upon convergence of belief propagation, the messages sent by each variable node $x_j$ approximate the marginal probability distribution of $x_j$ conditioned on $\phi_i$ being true. A technique for SAT solving, called decimation, picks a variable $x_i$ and a value u such that the marginal probability that $x_i$=u is the highest (among all variables in $\bar{x}$, and among all values), sets $x_i$ to u, and simplifies the formula $\phi$ with this assignment, leading to a formula $\phi(\bar{x})|_{x_i=u}$ in which variable $x_i$ has been substituted with value u. Next, belief propagation is run on the reduced formula $\phi(\bar{x})|_{x_i=u}$ to find the next variable $x_j$ and value u' with the highest marginal, and this process repeats until all variables are assigned values. If the marginal computation is exact, which is the case for acyclic factor graphs, decimation is a provably exact algorithm to solve SAT. If the factor graph has cycles, than the marginals computed on convergence of belief propagation are approximate, and decimation becomes a heuristic (without theoretical guarantees) that works well in practice.

A new decimation based approach is described herein to solve ∃*∀*QBF formulas. The algorithm (to be referred to as QOOL!) works over a new kind of factor graph called a Quantified Factor Graph (QFG). QFGs are tripartite graphs (see FIG. 4 for an example), with one part in the partition to represent factor nodes, one part in the partition to represent existentially quantified nodes, and one part in the partition to represent universally quantified nodes. Notable is the use of a new message passing algorithm over these QFGs. A significant rule in the message passing algorithm is that universal nodes function as "reflectors"—that is, if they receive a message μ from a factor node, they simply send a complement message ¬ μ back to the factor node. The complement message ¬ μ complements the probabilities in μ. If μ(x)=$\mathcal{B}$ (p), the Bernoulli distribution with mean p, then ¬ μ(x) is defined as the distribution $\mathcal{B}$ (1−p).

As discussed in Section 3 below (and in particular Theorem 1), this modified message passing algorithm over a QFG for a ∃*∀*QBF φ results in the same marginal probabilities as obtained by transforming φ to a SAT formula φ (by expanding out the universal quantifiers, potentially exploding the size of the formula), building a factor graph for φ, and running decimation based probabilistic inference algorithms on the factor graph for φ. The message passing approach herein avoids the potential exponential blowup from the QFG for the formula φ to the factor graph for φ, while still providing the same marginal probabilities that would be obtained even if the exploded factor graph for were constructed.

QOOL! can be used to solve arbitrary QBF formulas by using skolemization to convert all existential variables into skolem functions, and by using templates to select these skolem functions from a finite solution space. This process of skolemization and templatization converts an arbitrary QBF into ∃*∀*QBF form. Satisfiability of the transformed ∃*∀*QBF formula gives a sufficient condition for satisfiability of the original QBF. In case the transformed ∃*∀*QBF is satisfiable (not all are satisfiable), the QOOL! algorithm generates witness functions (or models) for each of the existentially quantified variables. Model generation is another useful feature of QOOL!, which is lacking in many QBF solvers. In the context of program synthesis, the generated models can be used to construct the synthesized programs. Thus, QOOL! is particularly suitable for program synthesis applications.

2. Preliminaries

This section introduces notation and background information. Familiarity with propositional Boolean formulae, which are logical formulae over the set of Boolean operators {∧, ∨, ¬ } and Boolean variables, will be assumed. Quantified Boolean Formulae (QBF) which are propositional Boolean formulae with existential and universal quantifiers, are defined as follows.

Definition 1. The existential quantification of a formula φ with respect to a variable x is defined as:

$$\exists x \cdot \varphi \stackrel{def}{=} \varphi(x=1) \vee \varphi(x=0) \quad (1)$$

The universal quantification of a formula φ with respect to a variable x is defined as:

$$\forall x \cdot \varphi \stackrel{def}{=} \varphi(x=1) \wedge \varphi(x=0) \quad (2)$$

Definition 2. A propositional Boolean formula is said to be satisfiable if there exists an assignment to its variables such that the formula evaluates to true. Computing a satisfying assignment to a propositional Boolean formula is an NP-complete problem. It will be assumed that a QBF has the following prenex normal form.

$$Q_1 x_1 \ldots Q_n x_n \cdot \phi \quad (3)$$

where φ is the matrix which is a quantifier-free propositional formula over variables $x_i$, 1≤i≤n, and where $Q_i \in \{\exists, \forall\}$, 1≤i≤n is a prefix of quantifiers.

Every QBF in prenex normal form can be transformed to an equisatisfiable formula with only universally quantified variables via skolemization. Specifically, given a QBF $Q_1 z_1 \ldots Q_n z_n \cdot \phi$ in prenex normal form, the process of skolemization replaces every existentially quantified variable y with a fresh function symbol $f_y(z_1, \ldots, z_m)$ (called the skolem function), where the variables $z_i \in \{x_i, \ldots, x_n\}$, 1≤i≤m, are universally quantified such that ∀y occurs in the scope of their quantifiers.

Example 1

Consider the QBF ∀x·∃y·p(x)∧ q(x, y). The skolemized formula is ∀x·p(x)∧ q(x, $f_y$(x)), where $f_y$ is the skolem function for the existentially quantified variable y.

Definition 3. Let φ be a QBF formula, and let $\hat{\phi}$ be its skolemized representation with only universally quantified variables. A QBF formula φ is satisfiable if and only if there exist skolem functions such that the formula $\hat{\phi}$ is satisfied for all values of the universally quantified variables. Determining whether a QBF is satisfiable or not is a PSPACE-complete problem.

The availability of templates for skolem functions will be assumed. A template restricts the space of possible skolem functions in order to make the search for a skolem function more tractable. This naturally fits with the objective of using a QBF solver to synthesize programs.

Example 2

Consider the skolem function $f_y$(x) from Example 1. By assuming a template $f_y$(x)∈{x, ¬ x}, the search space for $f_y$ can be reduced and a Boolean variable op can be used to specify which of the two functions is selected for $f_y$(x). This reduction can be significant for large QBFs. Furthermore, with this template, the skolemized formula now takes the following form:

$$\exists op \cdot \forall x \cdot p(x) \wedge q(x, (op \rightarrow x \wedge \neg op \rightarrow \neg x))$$

The next example illustrates skolemization with templates for a QBF with an alternation depth of three together with its satisfying model.

Example 3

Consider the following QBF.

$$\forall x \cdot \exists y \cdot \forall z \cdot \exists t \cdot (x \vee y) \wedge (\neg x \vee y) \neg (\vee t \neg x \vee z) \wedge$$
$$(t \vee \neg x) \wedge (t \vee \neg z)$$

By assuming templates $f_y(x)=\{x, \neg\}$ and $f_t(x, z)=\{x \vee z, \neg x \wedge \neg z\}$ for the skolem functions corresponding to variables y and t respectively, and variables $op_1$ and $op_2$ to specify which of these functions is selected for $f_y$ and $f_t$ respectively, the following formula is obtained upon skolemization.

$$\exists op_1 \cdot \exists op_2 \cdot \forall op_2 \cdot \forall x \cdot \exists z \cdot$$
$$(x \vee ((op_1 \rightarrow \neg x) \wedge (\neg op_1 \rightarrow x))) \wedge$$
$$(\vee x \neg ((\neg op_1 \rightarrow \neg x) \wedge (op_1 \rightarrow x))) \wedge$$
$$(((\neg op_2 = x \vee z) \wedge (op_2 \rightarrow \neg x \wedge \neg z)) \vee x \vee z) \wedge$$
$$(((op_2 \rightarrow x \vee z) \wedge (\neg op_2 \rightarrow \neg x \wedge \neg z)) \vee \neg x) \wedge$$
$$(((op_2 \rightarrow x \vee z) \wedge (\neg op_2 \rightarrow \wedge x \neg \neg z)) \vee \neg z)$$

This QBF is satisfiable with a model defined by the skolem functions $$f_y(x) = \neg x \text{ and } f_t(x,z) = x \vee z.$$

Thus, it can be seen that any QBF in prenex normal form under the template restriction and skolemization reduces to a formula with a prefix of quantifiers consisting of existentially quantified variables followed by universally quantified variables. This class of QBFs will be referred to as ∃*∀* formulae. The design of an algorithm for checking the satisfiability of ∃*∀* formulae is described in Section 3.

Note that using skolemization and template restriction produces solutions to the existentially quantified variables of the resulting ∃*∀* formulae produces instantiations for the skolem functions. For instance, the valuations to $op_1$ and $op_2$ in the formula for Example 3 (which is produced by our algorithm in Section 3), can be used to fix the skolem functions that are chosen for $f_y$ and $f_t$ respectively.

The algorithm to solve QBF formulae of the form $\exists \bar{x} \cdot \forall \bar{y} \cdot \phi(\bar{x}, \bar{y})$ does not require that the matrix $(\bar{x}, \bar{y})$ be in conjunctive normal form (CNF). It merely requires that $(\bar{x}, \bar{y})$ be expressed as a conjunction of subformulas, where each subformula is not necessarily a clause. This is notable due to the following two reasons.

First, the skolemizing transformations followed by templatization does not produce a CNF matrix (as illustrated in Examples 2 and 3 above). The resulting non-CNF matrix could be converted to CNF, but that is an expensive computation. Alternatively, temporary variables can be used to convert the non-CNF matrix to CNF without exploding the size, but the resulting QBF will be of the form ∃*∀*∃, due to the addition of temporary variables used in CNF conversion.

Second, if a QBF $\exists \bar{x} \cdot \forall \bar{y} \phi(\bar{x}, \bar{y})$ is such that $\phi(\bar{x}, \bar{y})$ is in CNF, then, it can be reduced to SAT by deleting all the variables $\bar{y}$ from each of the clauses in $(\bar{x}, \bar{y})$. Deleting does not require $(\bar{x}, \bar{y})$ to be in CNF. Such QBFs whose matrices are not necessarily in CNF naturally arise in program synthesis.

2.1 SAT Solving Via Probabilistic Inference

This section reviews a probabilistic inference algorithm called the belief propagation (BP) algorithm in the context of SAT solving.

Consider a Boolean formula $\phi = \wedge_{i=1}^{k} \phi_i$ that is a conjunction of k clauses $\phi_i$, $1 \le i \le k$, defined over n Boolean variables $\{x_1, \ldots x_n\}$. The Boolean formula can be expressed as a Boolean function:

$$F_\phi : \{0,1\}^n \rightarrow \{0,1\},$$

where $F_\phi(x_1=u_1, \ldots, x_n=u_n)=1$, if $(u_1, \ldots, u_n)$ is a satisfying assignment of the formula $\phi$, otherwise, $F_\phi(x_1=u_1, \ldots, x_n=u_n)=0$. The Boolean function $F_{\phi_i}$ for a clause $\phi_i$ defined similarly. Thus, the Boolean satisfiability problem for the propositional Boolean formula $\phi$ can be defined as follows.

Definition 4. Given a propositional Boolean formula $\phi = \wedge_{i=1}^{k} \phi_i$ defined over n variables $x_1, \ldots, x_n$ and k clauses $\phi_i$, $1 \le i \le k$, does there exist an assignment $(u_1, \ldots, u_n) \in \{0,1\}^n$ such that $F_\phi(u_1, \ldots, u_n)=1$?

FIG. 1 shows a Decimate 100 procedure. Belief propagation based SAT solvers employ decimation, as illustrated in the Decimate 100 procedure, to efficiently solve SAT problems. The Decimate shown in FIG. 1 takes a Boolean formula $\phi$ over variables $\{x_1, \ldots, x_n\}$ as input, and returns a satisfying assignment $\sigma : \{x_i, \ldots, x_n\}$ if $\phi$ is satisfiable. Decimate 100 is an incomplete procedure that is not guaranteed to either report a satisfying assignment or prove that the formula $\phi$ is unsatisfiable. Decimate 100 iteratively calls the procedure BP (described in Section 2.2) which is the belief propagation algorithm that returns a tuple (x, u). Essentially, BP ($F_\phi(X)$) returns the "(variable, value)" pair (x, u) with the highest marginal probability (the strongest "belief" about the formula). Informally, the marginal probability $p_i(x_i=u)$ denotes the fraction of solutions of the formula where the variable x is set $u \in \{0, 1\}$ and is defined as follows.

Definition 5. Let $F_\phi(x_1, \ldots, x_n)$ be the Boolean function for a Boolean formula $\phi$. The marginal distribution $p_i(x_i)$ is defined as follows.

$$p_i(x_i) = \frac{1}{Z} \sum_{x_1} \ldots \sum_{x_{i-1}} \sum_{x_{i+1}} \ldots \sum_{x_n} F_\varphi(x_1, \ldots, x_n) \quad (4)$$

where $Z = \sum_{x_1 \ldots x_n} F_\phi(x_1, \ldots, x_n)$ is a normalization constant. Equation 4 can be succinctly written as $$p_i(x_i) = \frac{1}{Z} \sum_{\sim \{x_1\}} F_\varphi(x_1, \ldots, x_n) \quad (5)$$

Given (x, u), the formula $\phi$ is simplified in line 5 (where $\phi|_{x=u}$ denotes the formula $\phi$ with variable x set to value u), and this process is continued until all variables have been assigned values. In line 8, the assignment σ is checked to see if it is indeed a satisfying assignment to $\phi$. If so, Decimate 100 returns σ, else it returns FAIL.

Equation 5 is an expensive computation (in fact, computing this expression is a ♯P-complete problem), and belief propagation over factor graphs is a widely used practical algorithm to tackle this problem.

2.2 Factor Graphs and Belief Propagation

Factor graphs are graphical models that the belief propagation algorithm uses to efficiently compute marginal probabilities. Belief propagation and its variants take advantage of the structure of factor graphs in order to significantly speed up computation of marginal distributions. Factor graphs and belief propagation over factor graphs will now be formally introduced.

Let $\phi = \wedge_{i=1}^{k} \phi_i$ be a Boolean formula over variables $\{x_1, \ldots x_n\}$, and $F_\phi(x_1, \ldots, x_n) \prod_{i=1}^{k} F_{\phi_i}(X_{\phi_i})$, $X_{\phi_i} \subseteq \{x_1, \ldots, x_n\}$, $1 \le i \le n$, be its corresponding Boolean function.

Definition 6. A factor graph is a bipartite graph that represents the factorization of the Boolean function $F_\phi$. A factor graph has two types of nodes:

Variable nodes: one node for every variable $x_i$; and

Factor nodes: one node for every function $F_{\phi_i}$.

A variable node x is connected to factor node F if and only if x is a parameter of F.

Example 4

Consider the following Boolean formula:

$$\varphi(x_1, x_2, x_3) = \underbrace{(x_1 \vee x_2)}_{\varphi_1} \wedge \underbrace{(\neg x_1 \vee x_3)}_{\varphi_2} \quad (6)$$

The Boolean function $F_\phi$ for $\phi$ is $$F_\phi(x_1, \ldots, x_n) = F_{\phi_1}(x_1, x_2) \cdot F_{\phi_2}(x_1, x_3) \quad (7)$$

where $$F_{\varphi_1}(x_1, x_2) = \begin{cases} 1 & \text{if } x_1 \vee x_2 = \text{true} \\ 0 & \text{otherwise} \end{cases} \quad (8)$$

$$F_{\varphi_2}(x_1, x_2) = \begin{cases} 1 & \text{if } \neg x_1 \vee x_3 = \text{true} \\ 0 & \text{otherwise} \end{cases} \quad (9)$$

FIG. 2 shows the factor graph 120 for $F_\phi$. There is a variable node 122 for each $x_i$, $1 \leq i \leq 3$, and a factor node 124 ($F_{\phi_j}$) for each clause $\phi_j$, $1 \leq i \leq 2$. There is an edge 126 between variable node $x_i$ and factor node $F_{\phi_j}$ is $x_i$ is a parameter of $F_{\phi_j}$.

FIG. 3 shows the belief propagation algorithm 140 (BP) over a factor graph. BP is an iterative algorithm that passes messages μ over the edges of the factor graph until convergence. Let G=(V, E) be the input factor graph with vertex set V and edge set E (for ease of exposition, G and $F_f$ will b used interchangeably). Every message μ: {0, 1}=[0, 1] maps a variable x to a probability. In other words, the messages are Bernoulli probability distributions. A Bernoulli probability distribution will be denoted by $\mathcal{B}$ (p) with mean p. Essentially, a random variable with distribution $\mathcal{B}$ (p) is equal to 1 with probability p, and is equal to 0 with probability (1−p). In lines 2-4, the BP algorithm 140 initializes every message from a variable node to a factor node to the uniform distribution $$\mathcal{B}\left(\frac{1}{2}\right).$$

Because the satisfying assignments to the formula are unknown, this uniform probability distribution represents the fact that there is no information—that is, all assignments are initially assumed to be possible solutions. Lines 6-16 are executed until convergence—that is, until there are no changes to the messages passed along the edges of G. Essentially, there are two types of messages that are passed along the edges of G, which are defined next.

Factor-to-Variable message: This is defined as $$\mu_{f \to x}(x) = \alpha_{f,x} \sum_{\sim\{x\}} \left( f(X_f) \prod_{y \in N(f) \setminus \{x\}} \mu_{y \to f}(y) \right) \quad (10)$$

where $\alpha_{f,x}$ is a normalization constant so that $\mu_{f \to x}(x)$ is a valid probability distribution. Informally, the message $\mu_{f \to x}$ (x) that a factor $f$ sends to a variable x is the marginal function (over x) of the pointwise product[2] of all the $\mu_{y \to f}(x)$ that it receives from its neighboring variable nodes (denoted by $\mathcal{N}(f)$) and the factor $f(X_f)$ (where $X_f \subseteq V$ are the parameters of $f$).

Variable-to-Factor message: This is defined as $$\mu_{x \to f}(x) = \alpha_{x,f} \prod_{h \in N(x) \setminus \{f\}} \mu_{h \to x}(x) \quad (11)$$

where $\alpha_{x,f}$ is a normalization constant so that $\mu_{x \to f}(x)$ is a valid probability distribution. Informally, the message $\mu_{x \to f}$ (x) that a variable x sends to a factor $f$ is the pointwise product of all the messages $\mu_{h \to x}(x)$ that it receives from its neighboring factor nodes (denoted by $N(f)$).

After convergence, lines 17-19 of the belief propagation algorithm 140 compute the marginal distribution $p_i(x_i)$ for every variable $x_i$ defined as follows.

$$p_i(x_i) = \alpha_{x_i} \prod_{f \in N(x_i)} \mu_{f \to x_i}(x_i) \quad (12)$$

where $x_i$ is a normalization constant such that $p_i(x_i)$ is a valid probability distribution.

Finally, in line 20, the algorithm BP returns the variable $x_i$ and value u with the highest marginal probability $p_i(x_i=u)$. The algorithm BP computes the exact maximum marginal if and only if the input factor graph G is acyclic. Otherwise, it computes an approximation to the marginal value—it is well known that these approximations to marginal probabilities are very good in practice for many applications. In fact, it has been shown empirically that choosing maximum BP marginals during decimation results in good approximations to the actual marginal distributions.

Example 5

Consider the propositional Boolean formula in Example 4. The factor graph for this formula is shown in FIG. 2. The flow of messages generated by the BP algorithm over this factor graph will now be explained.

Initialization: All variable-to-factor messages are initialized to the uniform Bernoulli distribution $$\mathcal{B}\left(\frac{1}{2}\right).$$

$$\mu_{x_1 \to F_{\varphi_1}}(x_1) = \mathcal{B}\left(\frac{1}{2}\right), \quad \mu_{x_1 \to F_{\varphi_2}}(x_1) = \mathcal{B}\left(\frac{1}{2}\right)$$

$$\mu_{x_2 \to F_{\varphi_1}}(x_2) = \mathcal{B}\left(\frac{1}{2}\right), \quad \mu_{x_3 \to F_{\varphi_2}}(x_3) = \mathcal{B}\left(\frac{1}{2}\right)$$

Iterations: Next, the messages are computed iteratively using Equations 10 and 11. In every step, the algorithm shows only messages that are different from the previous step and those that are required to show convergence (achieved in Step 3).

Step 1:

$$\mu_{F_{\varphi_1} \to x_1}(x_1) = \mathcal{B}\left(\frac{2}{3}\right), \quad \mu_{F_{\varphi_1} \to x_2}(x_2) = \mathcal{B}\left(\frac{2}{3}\right)$$

$$\mu_{F_{\varphi_2} \to x_1}(x_1) = \mathcal{B}\left(\frac{1}{3}\right)$$

Step 2:

$$\mu_{x_1 \to F_{\varphi_2}}(x_1) = \mathcal{B}\left(\frac{2}{3}\right), \quad \mu_{x_1 \to F_{\varphi_1}}(x_1) = \mathcal{B}\left(\frac{1}{3}\right)$$

$$\mu_{F_{\varphi_2} \to x_3}(x_3) = \mathcal{B}\left(\frac{3}{4}\right), \quad \mu_{F_{\varphi_1} \to x_2}(x_2) = \mathcal{B}\left(\frac{3}{4}\right)$$

Marginal computation: After convergence, the marginal distributions are computed using Equation 12.

$$p_1(x_1) = \mu_{F_{\varphi_1} \to x_1}(x_1) \cdot \mu_{F_{\varphi_2} \to x_1}(x_1) = \mathcal{B}\left(\frac{1}{2}\right)$$

$$p_2(x_2) = \mu_{F_{\varphi_1} \to x_2}(x_2) = \mathcal{B}\left(\frac{3}{4}\right)$$

$$p_3(x_3) = \mu_{F_{\varphi_2} \to x_3}(x_3) = \mathcal{B}\left(\frac{3}{4}\right)$$

Highest marginal: There are two highest marginal probabilities $$p_2(x_2 = 1) = p_3(x_3 = 1) = \frac{3}{4},$$

and thus the algorithm BP returns one of the pairs $(x_2, 1)$, $(x_3, 1)$. Indeed, the fraction of solutions of the formula $\phi(x_1, x_2, x_3)$ where $x_2=1$ and $x_3-1$ is ¾.

Assume that BP returns $(x_2, 1)$. This result is used by the Decimate 100 procedure (in line 5) to simplify the Boolean formula $\phi(x_1, x_2, x_3)$ to the Boolean formula $\hat\phi(x_1, x_3) = \neg x_1 \vee x_3$—this process is continued iteratively by calling BP on the factor graph $G_{\hat\phi}$ for the simplified formula $\hat\phi(x_1, x_3)$ until all variables have been assigned values.

The QOOL! Algorithm

This section describes the QOOL! algorithm for solving $\exists^*\forall^*$QBFs. First, a new class of factor graphs is defined that represent QBFs and a new algorithm to efficiently compute marginals over these graphs.

Definition 7. A quantified factor graph (QFG) is a tripartite graph that represents the factorization of the Boolean function $F_\phi$ for the matrix $\phi$ of a QBF. A QFG has three types of nodes:

∃ Variable nodes: one node for every existentially quantified variable.
∀ Variable nodes: one node for every universally quantified variable $u_i$.
Factor nodes: one node for every function $F_{\phi_i}$ in $F_\phi$.

A variable node x is connected to factor node F if and only if x is a parameter of F.

Example 6

Consider the following QBF.

$$\exists x_2 x_3 \cdot \forall x_1 \cdot \underbrace{\underbrace{(x_1 \vee x_2)}_{\varphi_1} \wedge \underbrace{(\neg x_1 \vee x_3)}_{\varphi_2}}_{\varphi} \tag{13}$$

Figure 4:
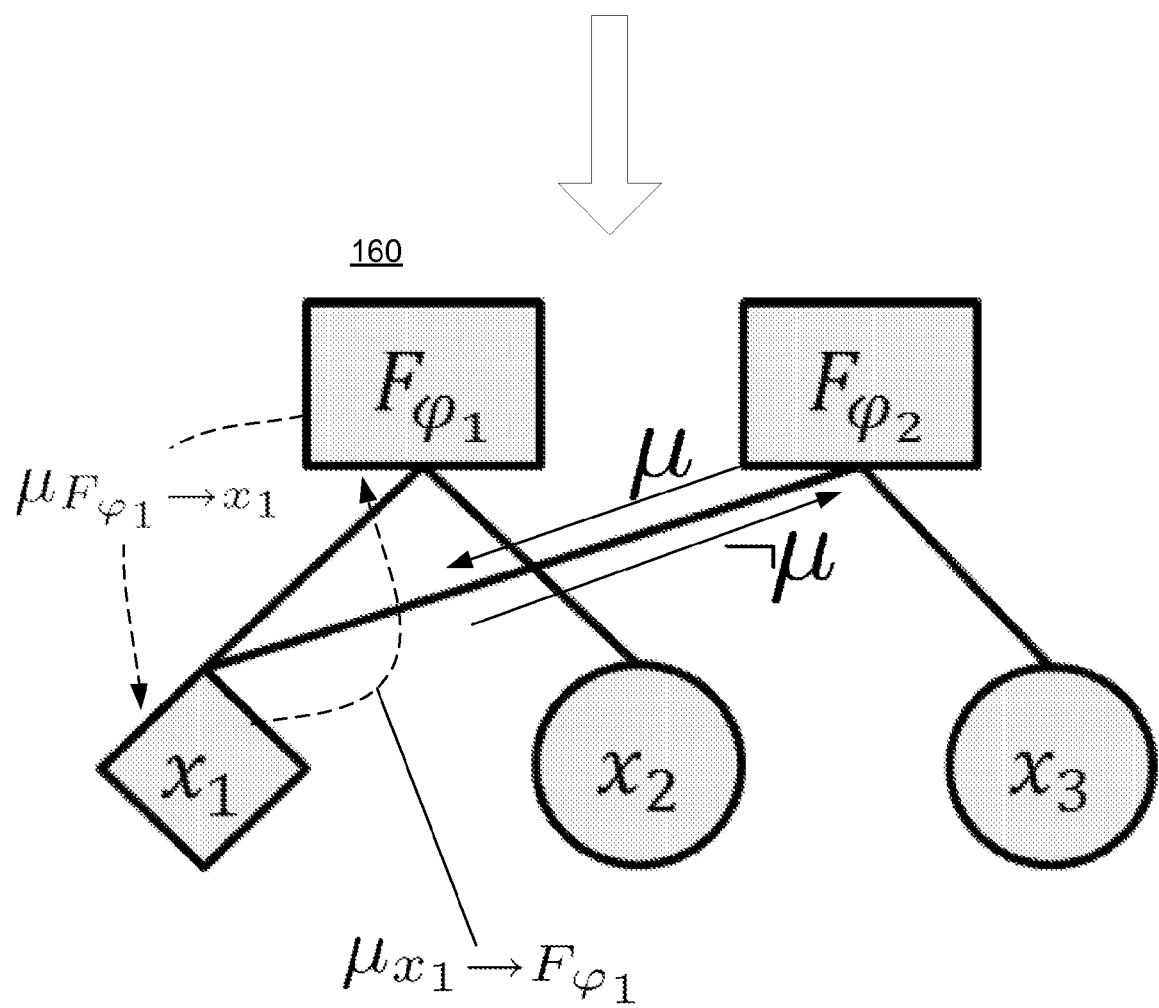
FIG. 4 shows a QFG (quantified factor graph).

FIG. 4 shows the QFG 160 for this QBF. Both $x_2$ and $x_3$ are existentially quantified nodes, whereas $x_1$ is a universally quantified node (shown by a diamond shaped node). As shown in FIG. 4, there is a factor node for every clause in the matrix of the QBF. There is an edge between variable node $x_i$ and factor node $F_{\phi_j}$ if $x_i$ is a parameter of $F_{\phi_j}$.

FIG. 5 shows the QOOL! algorithm 180 for solving QBFs. The QOOL! algorithm 180 takes a QBF ϕ as input and first converts it into a skolemized QBF with matrix ϕ in line 1 (via the call to the procedure Skolemize which implements the skolemization process discussed in Section 2). Note that ϕ is a conjunction of propositional formulae that are not necessarily clauses. Let $E=\{e_1, \ldots, e_m\}$ and $U=\{u_1, \ldots, u_n\}$ respectively be the set of existentially and universally quantified variables in ϕ. As with the procedure Decimate described in Section 2.1, QOOL! is also an incomplete procedure. QOOL! iteratively calls the procedure QBP (defined in Section 3.1) which is belief propagation over QFGs. The procedure QBP operates over an input QFG and returns the (existentially quantified variable, value) pair (e, u) with the highest marginal probability.

Given (e, u), the QBF ϕ is simplified in line 8, and this process is continued until all existentially quantified variables have been assigned values. In line 12, the assignment σ is checked to see if it is indeed a satisfying assignment to the QBF ϕ (this check requires a call to a SAT solver). If so, QOOL! returns σ, else it returns FAIL.

3.1 Quantified Belief Propagation

FIG. 6 shows the quantified belief propagation (QBP) algorithm 200. The QBP algorithm 200, like BP, is an iterative algorithm that passes messages μ over the edges of the QFG until convergence. Let $G=((V \cup U), E)$ be the input QFG with existential vertex set V, universal vertex set U and edge set E. Every message $\mu: \{0, 1\} \to [0, 1]$ maps a variable $x \in V \cup U$ to a probability. In lines 2-4, the algorithm QBP initializes every message from a variable node to a factor node to the uniform distribution $$\mathcal{B}\left(\frac{1}{2}\right).$$

Lines 6-19 are executed until convergence. Specifically, there are three types of messages that are passed along the edges of G, which are described next.

Factor-to-Variable message: This is similar to the BP algorithm and is defined as $$\mu_{f \to x}(x) = \alpha_{f,x} \sum_{\sim\{x\}} \left( f(X_f) \prod_{y \in N(f) \setminus \{x\}} \mu_{y \to f}(y) \right) \tag{14}$$

Existential Variable-to-Factor message: This is similar to the BP algorithm and is defined as $$\mu_{x \to f}(f) = \alpha_{x,f} \prod_{h \in N(x) \setminus \{f\}} \mu_{h \to x}(x) \quad (15)$$

Universal Variable-to-Factor message: This is defined as $$\mu_{x \to f}(x) = \neg_{f \to x}(x) \quad (16)$$

where the $\neg$ operator is overloaded to work over random variables. If a random variable Y is distributed according to the probability distribution B(p), then the random variable $\neg$ Y is distributed according to $\mathcal{B}$ (1−p). Essentially, a universal node acts as a "reflector" and sends back the negation of the messages that it receives from its neighboring factor nodes.

After convergence, lines 20-22 compute the marginal distribution $p_i(x_i)$ for every variable $x_i$ defined as follows.

$$p_i(x_i) = \alpha_{x_i} \prod_{f \in N(x_i)} \mu_{f \to x_i}(x_i) \quad (17)$$

where $x_i$ is a normalization constant such that $p_i(x_i)$ is a valid probability distribution.

Finally, in line 23, the algorithm QBP returns the variable x and value u with the highest marginal probability $$p_i(x_i = u).$$

Any QBF $\exists \overline{x} \cdot \forall \overline{y} \cdot \phi(\overline{x}, \overline{y})$ can be converted into a propositional Boolean formula $\exists \overline{x} \cdot \forall \overline{y} \cdot \phi(\overline{x}, \overline{y})(\overline{x}, \overline{y})$, by iteratively using Equation 2 for each universally quantified variable. Of course, any QBF can be expanded in this manner to a propositional Boolean formula which can then be checked for satisifiability. Unfortunately, this procedure, in general, is likely to result in a blow-up of the propositional Boolean formula unless PSPACE=NP. The following theorem shows that QBP over a QFG for a QBF is equivalent to BP over a factor graph for the expanded QBF.

Theorem 1. Let $\exists \overline{x} \cdot \forall \overline{y} \cdot \phi(\overline{x}, \overline{y})$ be a QBF and let $G_\phi$ be its corresponding QFG. Let $\exists \overline{x} \cdot \exists \overline{y} \cdot \phi(\overline{x}, \overline{y})$ be the expanded version of the QBF. Let $G_\phi$ be its corresponding factor graph. Then the marginal probabilities for existentially quantified variables in $G_\phi$ computed by QBP ($G_\phi$) are equal to those computed by BP ($G_\phi$).

Proof: to show that operationally QBP($G_\phi$) is essentially the same as BP($G_\phi$)—that is, the marginal functions for existentially quantified variables computed by QBP($G_\phi$) and BP($G_\phi$) are the same, let $X = \{x_1 \ldots, x_m\}$ and $Y = \{y_1, \ldots, y_n\}$ respectively be the set of existentially and universally quantified variables in the QBF.

The theorem will first be proven for QBFs with exactly one universally quantified variable, that is, $Y = \{y\}$ and the corresponding QBF is $\exists \overline{x} \cdot \forall y \cdot \phi(\overline{x}, y)$. The expanded QBF is the propositional Boolean formula $\exists \overline{x} \cdot \exists y \cdot \phi(\overline{x}, y), \phi(\overline{x}, y) = \phi(\overline{x}, y) \wedge \phi(\overline{x}, \neg y)$.

Let $\{F_i\}_{1 \le i \le k}$ be the set of factors in the QFG $G_\phi$ which have y as a parameter. Without loss of generality, it will be assumed that this set is not empty. The factor graph $G_\phi$ consists of the factors $\{F_i\}_{1 \le i \le k}$ as well as additional factors $\{_i\}_{1 \le i \le k}$, where each $F_i^{\neg y}$ is the factor $F_i$ with the universally quantified variable y negated.

First the following claim will be proven by induction on the number of iterations n of the algorithm BP($G_\phi$).

Claim 1. In every iteration of BP($G_\phi$), $$\mu_{F_i \to y}(y) = \neg \mu_{F_i^{\neg y} \to y}(y) = \neg \mu_{y \to F_i}(y)$$

for i, $1 \le i \le k$.

Note that $\mu_{F_{i \to y}}(y) = \neg \mu_{y \to F_i}(y)$ corresponds exactly to the case in QBP ($G_\phi$) where the universally quantified variable y reflects its received message from the factor $F_i$ in the QFG $G_\phi$ (given by Equation 16). Assume that the claim holds for all iterations less than n. Therefore, at the end of iteration n−1, it is assumed that there are the following messages for each i, $1 \le i \le k$, $$\mu_{F_i \to y}^{(n-1)}(y) = \beta(p_i) \quad (18)$$

$$\mu_{F_i^{\neg y} \to y}^{(n-1)}(y) = \mathcal{B}(1 - pi) \quad (19)$$

$$\mu_{y \to F_i}^{(n-1)}(y) = \mathcal{B}(1 - pi) \quad (20)$$

where $p_i \in (0, 1)$, $1 \le i \le k$.

From Equation 11:

$$\mu_{y \to F_i}^{(n)}(y) = \alpha_y \cdot F_i \cdot \prod_{j \ne i} \mu_{F_j \to y}^{(n-1)}(y) \cdot \prod_j \mu_{F_j^{\neg y} \to y}^{(n-1)}(y) \quad (21)$$

This can be rewritten as $$\mu_{y \to F_i}^{(n)}(y) = \mu_{F_i^{\neg y} \to y}^{(n-1)}(y) \cdot \alpha_y, F_i \cdot \prod_{j \ne i} \mu_{F_i \to y}^{(n-1)}(y) \cdot \mu_{F_i^{\neg y} \to y}^{(n-1)}(y) \quad (22)$$

and $$\mu_{y \to F_i}^{(n)}(y) = \mu_{F_i^{\neg y} \to y}^{(n-1)}(y) \cdot \prod_{j \ne i} \mathcal{B}(1 - p_i)\mathcal{B}(p_i) = \mu_{F_i^{\neg y} \to y}^{(n-1)}(y) \quad (23)$$

Equation 23 follows from the fact that for any $p \in (0, 1)$ $$\mathcal{B}(p) \cdot \mathcal{B}(1 - p) = \mathcal{B}\left(\frac{1}{2}\right)$$

(after suitable normalization to ensure that the result is a probability distribution).

Since $\mu_{F_i^{\neg y} \to y}^{(n)}(y) = \mu_{F_i^{\neg y} \to y}^{(n-1)}(y) = \mathcal{B}(1 - pi),$ (24)

from Equation 23:

$$\mu_{y \to F_i}^{(n)}(y) = \mu_{F_i^{\neg y} \to y}^{(n)}(y) = \mathcal{B}(1 - pi)$$

From Equation 11:

$$\mu_{y \to F_i^{\neg y}}^{(n)}(y) = \alpha_y, F_i^{\neg y} \cdot \prod_{j \ne i} \mu_{F_j^{\neg y} \to y}^{(n-1)}(y) \cdot \prod_j \mu_{F_j \to y}^{(n-1)}(y) \quad (25)$$

This can be rewritten as $$\mu_{y \to F_i}^{(n)}(y) = \mu_{F_i \to y}^{(n-1)}(y) \cdot \alpha_{y,F_i \neg y} \cdot \prod_{j \neq i} \mu_{F_j \to y}^{(n-1)}(y) \cdot \mu_{F_i \neg y \to y}^{(n-1)}(y) \quad (26)$$

and $$\mu_{y \to F_i}^{(n)}(y) = \mu_{F_i \to y}^{(n-1)}(y) \cdot \prod_{j \neq i} \mathcal{B}(1 - p_i) \mathcal{B}(p_i) = \mu_{F_i \to y}^{(n-1)}(y). \quad (27)$$

Since $\mu_{F_i \to y}^{(m)}(y) = \mu_{F_i \to y}^{(n-1)}(y) = \mathcal{B}(p_i)$, from Equation 27: (28)

$$\mu_{y \to F_i}^{(n)}(y) = \mu_{F_i \to y}^{(n)}(y) = \mathcal{B}(p_i)$$

From Equation 24, Equation 28 and the fact $\mathcal{B}(p_i) = \neg \mathcal{B}(1-p_i)$, the induction hypothesis is proven for iteration n.

$$\mu_{F_i \to y}^{(n)}(y) = \neg \mu_{F_i \neg y \to y}^{(n)}(y) = \neg \mu_{y \to F_i}^{(n)}(y) \quad (29)$$

From the initialization step in BP($G_\phi$) where all variable-to-factor messages are set to $$\mathcal{B}\left(\frac{1}{2}\right),$$

the base case for the induction also follows and the claim follows.

Since the equations for QBP($G_\phi$) and BP($G_\phi$) are identical for existentially quantified variables, in order to prove equivalence of these algorithms, Equation 16 will be proven for the universally quantified variable y, which is exactly the statement of Claim 1. Therefore, QBP($G_\phi$) is equivalent to BP($G_\phi$) with restriction that Y={y}.

Consider the QBF with Y={$y_1, \ldots, y_n$}. Now for any arbitrary y∈Y, let $\bar{z}$ be the sequence $\bar{y}$ with the universally quantified variable y removed. Then, the following holds (from Equation 2)

$$\phi(\bar{x},\bar{y}) = \phi(\bar{x},\bar{z},y) \wedge \phi(\bar{x},\bar{z},\neg y) \quad (30)$$

Given this transformation, Claim 1 holds by treating y as the only universally quantified variable in the proof of the claim, and this can be done for every y∈Y. Thus Claim 1 holds for the QBF with Y={$y_1, \ldots, y_n$} and the theorem follows.

The essence of Theorem 1 is that QBP($G_\phi$) smartly performs BP($G_\phi$) in a "quantification" aware manner—it naturally takes care of universally quantified variables without expanding them out, thus providing an avenue for scalability.

Example 7

Consider the QBF in Example 6. The QFG for this formula is shown in FIG. 4. The flow of messages generated by the QBP algorithm over this factor graph is as follows.

Initialization: All variable-to-factor messages are initialized to the uniform Bernoulli distribution $$\mathcal{B}\left(\frac{1}{2}\right).$$

$$\mu_{x_1 \to F_{\varphi_1}}(x_1) = \mathcal{B}\left(\frac{1}{2}\right), \mu_{x_1 \to F_{\varphi_2}}(x_1) = \mathcal{B}\left(\frac{1}{2}\right)$$

$$\mu_{x_2 \to F_{\varphi_1}}(x_2) = \mathcal{B}\left(\frac{1}{2}\right), \mu_{x_3 \to F_{\varphi_2}}(x_3) = \mathcal{B}\left(\frac{1}{2}\right)$$

Iterations: Next, the messages are computed iteratively using Equations 14, 15 and 16. In every step, only shown are messages that are different from the previous step and those that are required to show convergence (achieved in Step 3).

Step 1:

$$\mu_{F_{\varphi_1} \to x_1}(x_1) = \mathcal{B}\left(\frac{2}{3}\right), \mu_{F_{\varphi_2} \to x_1}(x_1) = \mathcal{B}\left(\frac{1}{3}\right)$$

Step 2:

$$\mu_{x_1 \to F_{\varphi_1}}(x_1) = \mathcal{B}\left(\frac{1}{3}\right), \mu_{x_1 \to F_{\varphi_2}}(x_1) = \mathcal{B}\left(\frac{2}{3}\right)$$

Step 3:

$$\mu_{F_{\varphi_1} \to x_2}(x_2) = \mathcal{B}\left(\frac{3}{4}\right), \mu_{F_{\varphi_2} \to x_3}(x_3) = \mathcal{B}\left(\frac{3}{4}\right)$$

Marginal computation: After convergence, the marginal distributions are computed using Equation 17

$$p_1(x_1) = \mu_{F_{\varphi_1} \to x_1}(x_1) \cdot \mu_{F_{\varphi_2} \to x_1}(x_1) = \mathcal{B}\left(\frac{1}{2}\right)$$

$$p_2(x_2) = \mu_{F_{\varphi_1} \to x_2}(x_2) = \mathcal{B}\left(\frac{3}{4}\right)$$

$$p_3(x_3) = \mu_{F_{\varphi_2} \to x_3}(x_3) = \mathcal{B}\left(\frac{3}{4}\right)$$

Highest marginal: There are two highest marginal probabilities for existentially quantified variables $$p_2(x_2 = 1) = p_3(x_3 = 1) = \frac{3}{4},$$

and thus the algorithm QBP returns one of the ($x_2$, 1), ($x_3$, 1). As expected, QBP computes a marginal distribution of $$\mathcal{B}\left(\frac{1}{2}\right)$$

for the universally quantified variable $x_1$. Indeed, since a solution for a QBF is defined over all values of a universally quantified variable, the uniform distribution $$\mathcal{B}\left(\frac{1}{2}\right)$$

for $x_1$ is obtained.

Assume that QBP returns ($x_2$, 1). Analogous to the Decimate procedure, QOOL! uses this result (in line 8) to simplify the QBF to $\exists \cdot x_3 \cdot \forall x_1 \cdot (\neg x_1 \vee x_3)$—this process is continued iteratively by calling QBP on the QFG $G_{\hat{\phi}}$ for the simplified formula $\exists x_3 \cdot \forall x_1 \cdot (\neg x_1 \vee x_3)$) until all the existential variables have been assigned values.

Example 8

Here is another example that illustrates the iterations of QBP for the following QBF.

$$\exists x_2 \cdot \exists x_3 \cdot \forall x_1 \cdot \underbrace{(x_1 \vee x_2)}_{\varphi_1} \wedge \underbrace{(x_1 \vee \neg x_3)}_{\varphi_2} \tag{31}$$

The QFG for this formula is the same as the one shown in FIG. 4. The flow of messages generated by the QBP algorithm over this factor graph will now be illustrated.

Initialization: All variable-to-factor messages are initialized to the uniform Bernoulli distribution $$\mathcal{B}\left(\frac{1}{2}\right).$$

$$\mu_{x_1 \to F_{\varphi_1}}(x_1) = \mathcal{B}\left(\frac{1}{2}\right), \mu_{x_1 \to F_{\varphi_2}}(x_1) = \mathcal{B}\left(\frac{1}{2}\right)$$

$$\mu_{x_2 \to F_{\varphi_1}}(x_2) = \mathcal{B}\left(\frac{1}{2}\right), \mu_{x_3 \to F_{\varphi_2}}(x_3) = \mathcal{B}\left(\frac{1}{2}\right)$$

Iterations: Next, the messages are computed iteratively using Equations 14, 15 and 16. In every step, the algorithm only shows messages that are different from the previous step and those that are required to show convergence (achieved in Step 3).

Step 1:

$$\mu_{F_{\varphi_1} \to x_1}(x_1) = \mathcal{B}\left(\frac{2}{3}\right), \mu_{F_{\varphi_2} \to x_1}(x_1) = \mathcal{B}\left(\frac{2}{3}\right)$$

Step 2:

$$\mu_{x_1 \to F_{\varphi_1}}(x_1) = \mathcal{B}\left(\frac{1}{3}\right), \mu_{x_1 \to F_{\varphi_2}}(x_1) = \mathcal{B}\left(\frac{1}{3}\right)$$

Step 3:

$$\mu_{F_{\varphi_1} \to x_2}(x_2) = \mathcal{B}\left(\frac{3}{4}\right), \mu_{F_{\varphi_1} \to x_3}(x_3) = \mathcal{B}\left(\frac{1}{4}\right)$$

Marginal computation: After convergence, the marginal distributions are computed using Equation 17.

$$p_1(x_1) = \mu_{F_{\varphi_1} \to x_1}(x_1) \cdot \mu_{F_{\varphi_2} \to x_1}(x_1) = \mathcal{B}\left(\frac{1}{2}\right)$$

$$p_2(x_2) = \mu_{F_{\varphi_1} \to x_2}(x_2) = \mathcal{B}\left(\frac{3}{4}\right)$$

$$p_3(x_3) = \mu_{F_{\varphi_2} \to x_3}(x_3) = \mathcal{B}\left(\frac{1}{4}\right)$$

Highest marginal: There are two highest marginal probabilities for existentially quantified variables $$p_2(x_2 = 1) = p_3(x_3 = 0) = \frac{3}{4},$$

and thus the algorithm QBP returns one of the pairs $(x_2, 1)$, $(x_3, 0)$. Like in the earlier example, QBP computes a marginal distribution of $$\mathcal{B}\left(\frac{1}{2}\right)$$

for the universally quantified variable $x_1$.

4. Experimental Evaluation

A prototype of QOOL! can be implemented in C# using the INFER.NET framework, a .NET library that provides APIs to probabilistic inference algorithms. The Z3 theorem prover is used to implement the satisfiability check in line 12 of the QOOL! algorithm 180 shown in FIG. 5. All experiments were performed on a system with 1.67 GHz Intel Core 2 Duo processor and 2 GB RAM running Microsoft Windows Vista™.

We focus on the task of synthesizing the class of straight-line programs, or more generally, loop-free programs, parameterized by the set of operators/components used. This class covers a wide range of useful computations.

Every program synthesis instance considered is described by a logical specification that relates inputs and outputs together with a set of base components. Our objective is to synthesize a straight-line program that satisfies the specification and that is constructed from a subset of the base components. Known techniques can be used to convert program synthesis instances to QBFs which are consumed by QOOL!. The model or satisfying assignment to the QBF produced by QOOL! is the desired synthesized program.

4.1 Benchmarks

QOOL! was evaluated on a number of benchmarks from recent work on program synthesis. Benchmarks can be categorized as (a) Programs synthesis for integer arithmetic problems, (b) Programs synthesis for bitvector problems, and (c) Synthesizing strategies for games (in particular, for the game NIM).

(a) Program Synthesis for Integer Arithmetic Problems:

These are benchmarks where the specification is an integer constraint over the program's input-output pairs. FIG. 7 shows a benchmark specification table 220. The table 220 shows the specifications for the benchmarks I1, I2 and I3, which are described elsewhere. FIG. 8 shows programs 240 synthesized by QOOL! for the specifications in FIG. 7. For these experiments, bit-blasting was used to convert the integer constraints into a specification over Boolean variables. A set of base components along with the specification for each component is taken as input from the user. Using these components, an $\exists^* \forall^*$QBF is constructed, which is solved using QOOL!.

Figure 9:
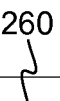
FIG. 9 shows program specifications.

(b) Program Synthesis for Bitvector Problems:

These are benchmarks for bitvector circuit synthesis problems. The specification 260 for these problems is given by the functional relation between the inputs and outputs of the circuit and is shown in FIG. 9. The programs 280 synthesized by QOOL! for these specifications are shown in FIG. 10. The functions used in these programs 280 have the standard semantics as defined in SMTLIB QF BF logic. As in the case for integer arithmetic problems, bit-blasting was used to convert the bitvector constraints into a specification over Boolean variables.

(c) Synthesizing a Strategy for the NIM Game:

NIM is a two player game in which players take turns removing objects from a set of distinct heaps, one or more objects from the same heap at a time. The player who removes the last object wins the game. NIM is not a fair game—given the right conditions, there is a strategy such that the player who starts the game cannot lose. The winning strategy for a player is to ensure that each move made leaves the game in a configuration where the bitwise XOR of the number of objects in each heap is zero.

The problem of synthesizing a winning strategy for a version of NIM where there are only two heaps is considered. The specification for this instance of NIM is a $\exists^*\forall^*$ formula and is defined as follows.

$$\forall A,B \cdot \exists k \cdot (XOR(A-k,B)=0) \vee (XOR(A,B-k)=0)$$

Intuitively, this says that the target program should take two heap configurations A, B as input and return a move of size k such that winning strategy condition described above holds. With this specification, QOOL! is able to synthesize the following program which represents the winning strategy.

4.2 Results

For performance evaluation, compare QOOL! is compared with the BP algorithm over expanded QBF formulae with the universally quantified variables eliminated. FIG. 11 shows results 300 of this comparison. The benchmark Q1 is the QBF formula shown in Example 3 and the benchmark Q2 is a QBF formula taken from the Letz suite taken from QBFLIB. This formula has 10 existentially quantified variables, 10 universally quantified variables and 36 clauses. As seen from FIG. 11, QOOL! clearly outperforms BP—the BP algorithm on the expanding formula times out on benchmarks B5, B6 and Nim, whereas QOOL! completes successfully (where the time out is set to 30 minutes). It is also interesting to note that the SKETCH tool (v1.3.0) also times out on the benchmarks B5 and B6.

CONCLUSION

Program synthesis is an emerging area of active research, with several applications on the horizon. Just as SAT solvers have powered program verification tools over the past decade, QBF solvers can now power program synthesis tools. In particular, if $\exists^*\forall^*$QBF formulae can be solved in a scalable manner, then it is possible to reduce a large class of synthesis problems and arbitrary QBF formulae from other applications (such as model checking and game solving) to this fragment using skolemization to witness existential variables, and using templates to instantiate skolem functions from a finite state space.

Described herein is a new algorithm, QOOL!, based on a new belief propagation algorithm to solve $\exists^*\forall^*$QBF formulae. Nodes can be treated as corresponding to universally quantified variables in a special manner in graphical models of these formulas, where the nodes negate incoming messages and reflect them back to the sending nodes. It is proven above (Theorem 1) that this algorithm precisely captures the effect of expanding out the universal quantifiers, and produces the same marginal probabilities as would be produced by such an expansion. The implementation of QOOL! is able to efficiently solve several synthesis problems and other QBF problems from published literature, and in some cases is able to finish where previous tools have not been able to finish.

Following are some examples of programs that can be solved or synthesized with QOOL!: the set of components including arithmetic operators and bitwise operators (bitvector algorithms); the set of components including basic editing commands available in a text-editor such as insert, locate, select and delete (text editing programs); the set of components including geometrical constructors such as ruler and compass (geometric constructions); the set of components including those that the underlying decision procedure can reason about such as linear arithmetic operators and set operators (unbounded data type manipulation); and API (application programming interface) call sequences.

Figure 12:
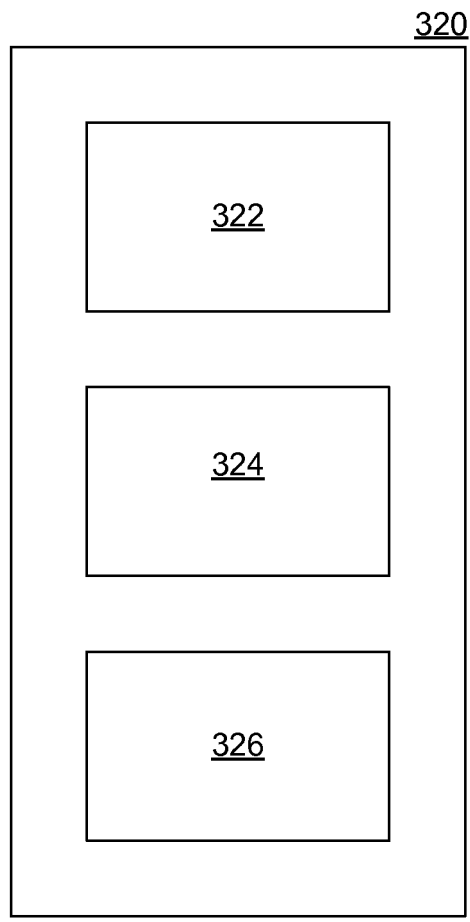
FIG. 12 shows a computer.

FIG. 12 shows a computer 320 with which embodiments and features discussed above can be realized. The computer 320 has a processor 322 cooperating with memory 324 and non-volatile storage 326. The embodiments can be realized in the form of information stored in volatile memory 324 or the non-volatile storage 326 (e.g., device readable media). This volatile memory 324 or the non-volatile storage 326 is deemed computer-readable storage media, examples of which include media such as optical storage (e.g., compact-disk read-only memory (CD-ROM)), magnetic media, flash read-only memory (ROM), or any current or future tangible means of storing digital information in a form convenient for consumption by a processor. The stored information can be in the form of machine executable instructions (e.g., compiled executable binary code), source code, bytecode, or any other information that can be used to enable or configure computing devices to perform the various embodiments discussed above. Again, this information may be stored in various forms in random-access memory (RAM) and/or virtual memory storing information such as central processing unit (CPU) instructions during execution of a program carrying out an embodiment, as well as non-volatile media storing information that allows a program or executable to be loaded and executed. The embodiments and features can be performed on any type of computing device, including portable devices, workstations, servers, mobile wireless devices, and so on; computer 320 is merely an example.

The invention claimed is:

1. A method performed by a computing device comprised of memory and a processor cooperating to perform the method, the method performed by the computing device comprising:

executing, by the processor, a quantified belief propagation (QBP) algorithm that receives as input, from the memory, an existentially quantified boolean formula comprised of existentially quantified boolean variables, universally quantified variables, and a boolean formula comprised of subformulas each comprising one or more boolean operators operating on one or more of the existentially quantified variables and/or one or more of the universally quantified variables;

constructing, in the memory, a tripartite graph comprised of nodes comprising: (i) there-exists nodes that correspond to and represent the existentially quantified variables, respectively, (ii) for-all nodes that correspond to and represent the universally quantified variables, and (iii) sub-formula nodes that correspond to and represent the sub-formulas, respectively;

finding a set of boolean values of the existentially quantified variables by (i) passing a first message from an arbitrary sub-formula node to an arbitrary for-all node, and (ii) in response, passing a second message from the arbitrary for-all node to the arbitrary sub-formula node; and storing the set of boolean values in the memory.

2. A method according to claim 1, wherein the first message comprises a first probability, held by the arbitrary sub-formula node, of a boolean value of the universally quantified variable represented by the arbitrary for-all node.

3. A method according to claim 2, wherein the second message comprises a second probability computed from the first probability.

4. A method according to claim 3, wherein the second probability is one minus the first probability.

5. A method according to claim 1, further comprising:
executing an algorithm that uses the QBP algorithm to find a solution to a problem input to the algorithm, wherein the algorithm comprises either: a program synthesis algorithm, or a model checking algorithm.

6. A method according to claim 1, further comprising: executing a program synthesis algorithm that uses the QBP algorithm to find a program that satisfies a program specification input to the program synthesis algorithm.

7. A method according to claim 6, wherein the using the QBP algorithm comprises generating the existentially quantified boolean formula from the program specification.

8. An apparatus storing information to enable a computing device to perform a process, the computing device comprising a processor and physical storage, the process comprising:
performing, by the processor, a belief propagation algorithm by constructing a qualified factor graph stored in the memory, the qualified factor graph comprising first nodes that represent sub-formulas of a boolean formula, second nodes that represent existentially quantified boolean variables in the sub-formulas, and third nodes representing universally quantified boolean variables in the sub-formulas; and
finding and storing in the physical storage, by the processor, a solution to a boolean formula comprised of the sub-formulas by the processor passing messages from the third nodes to the first nodes.

9. An apparatus according to claim 8, the process further comprising passing a first message from a first node to a third node, and in response generating a second message based on the first message and passing the second message from the third node to the first node, wherein the first message and the second message are passed within a repeating loop that passes messages between the first and the second nodes and between the first and the third nodes, but not between the second and the third nodes, wherein the repeating loop repeats until convergence to the solution is detected.

10. An apparatus according to claim 9, wherein the second message cancels a probabilistic belief that would otherwise be propagated by the first message.

11. An apparatus according to claim 8, wherein the messages from the third nodes to the first nodes reflect probabilistic inferences about values of the universally quantified boolean variables, wherein the solution to the boolean formula has specific true/false values for the existentially quantified boolean variables, and the solution values of the existentially quantified boolean variables satisfy the boolean formula regardless of any specific boolean value of any of the universally quantified variables.

12. An apparatus according to claim 8, the process further comprising iteratively invoking the belief propagation algorithm for each existentially quantified variable and each universally quantified variable, where each iteration finds a true or false value for the corresponding universally quantified variable.

13. An apparatus according to claim 8, where each message comprises a first probability that a universally quantified variable represented by the third node is true, and a second probability that the universally quantified variable represented by the third node is false.

14. An apparatus according to claim 13, wherein a cancellation message sent in response to one of the messages cancels a probabilistic effect of the one of the messages.

15. An apparatus according to claim 14, wherein the cancellation message comprises a third probability that the universally quantified variable represented by the third node is true and a fourth probability that the universally quantified variable represented by the third node is false.

16. A computer comprised of a processor, memory, and non-volatile storage, the non-volatile storage storing processor instructions corresponding to the processor, the instructions, when executed by the processor, performing a process comprising:
receiving, by the processor, and storing in the memory, a quantified boolean formula comprised of variables in the memory, including existentially quantified variables, universally quantified variables, and comprised of boolean operators in the memory operating on the existentially quantified variables and the universally quantified variables; and
finding, by the processor, and storing in the memory, a solution comprising a set of boolean values of the respective existentially quantified variables that satisfy the quantified boolean formula, wherein the finding is performed by executing a belief propagation algorithm in the memory in a manner that takes into account the universally quantified variables without expanding the universally quantified variables, wherein the set of boolean values are found based in part on inferred probabilities of boolean values of the universally quantified variables.

17. A computer according to claim 16, wherein the belief propagation algorithm automatically reflects or negates probability inferences about the universally quantified variables.

18. A computer according to claim 16, wherein the belief propagation algorithm, while iterating, checks for convergence of a universally quantified variable, and also while iterating passes messages from nodes representing sub-formulas of the quantified boolean formula to nodes representing the universally quantified variables, which causes messages to be reflected back from the nodes representing the universally quantified variables to the nodes representing the sub-formulas.

19. A computer according to claim 16, wherein the belief propagation algorithm is invoked by a program synthesis algorithm executing on the computer, the program synthesis algorithm invoking the belief propagation algorithm to find a program that satisfies a program specification provided as input to the program synthesis algorithm.

20. A computer according to claim 19, wherein the program specification specifies a bitvector program, a text-editing program, a geometric construction program, an unbounded data type manipulation program, or a sequence of API (application programming interface) calls.

* * * * *